(No Model.) 2 Sheets—Sheet 2.
M. MAROLLE.
CONVEYER FOR EXCAVATORS, DREDGERS, &c.
No. 316,377. Patented Apr. 21, 1885.
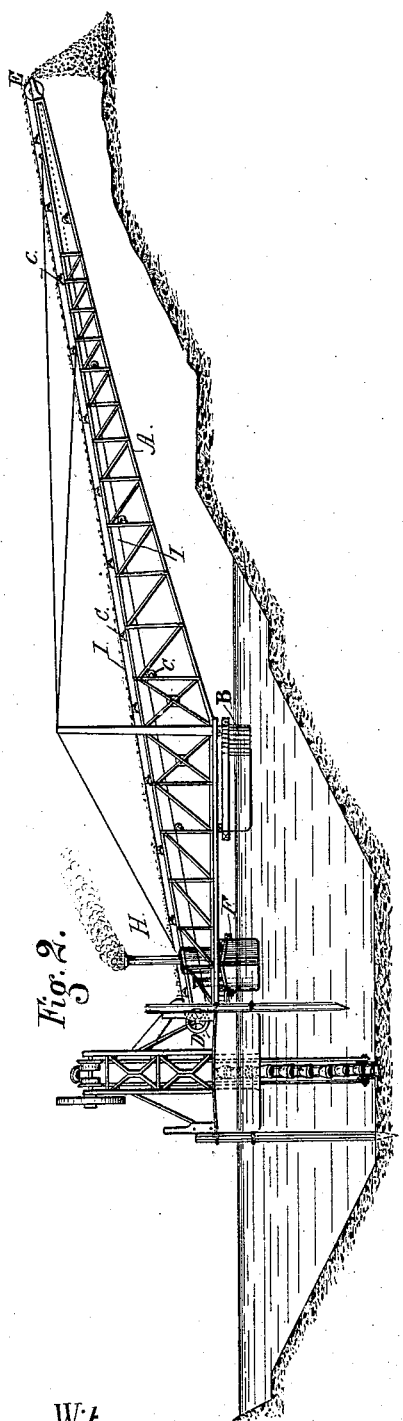
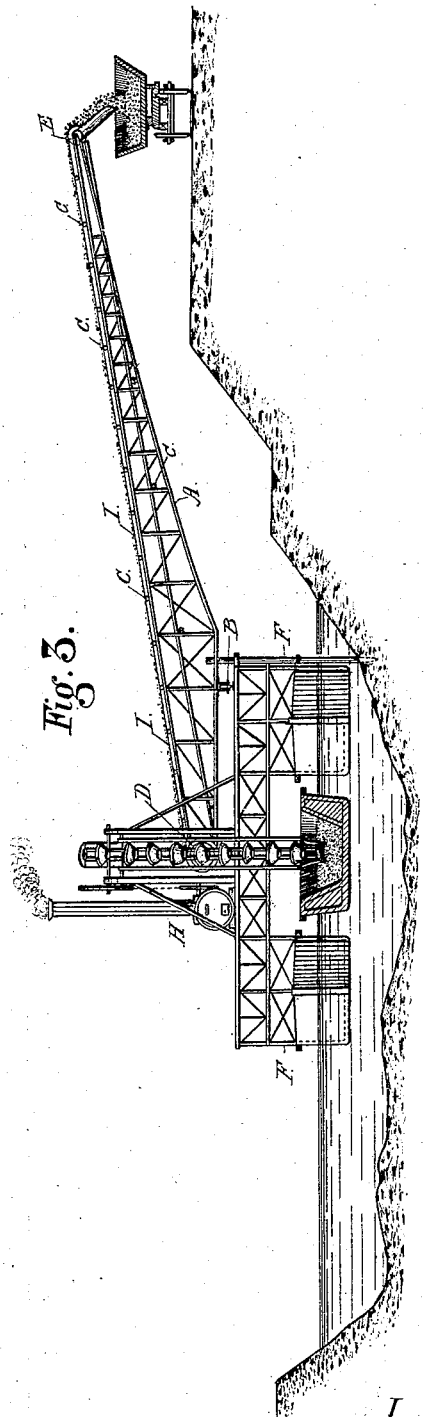
Witnesses. Inventor.

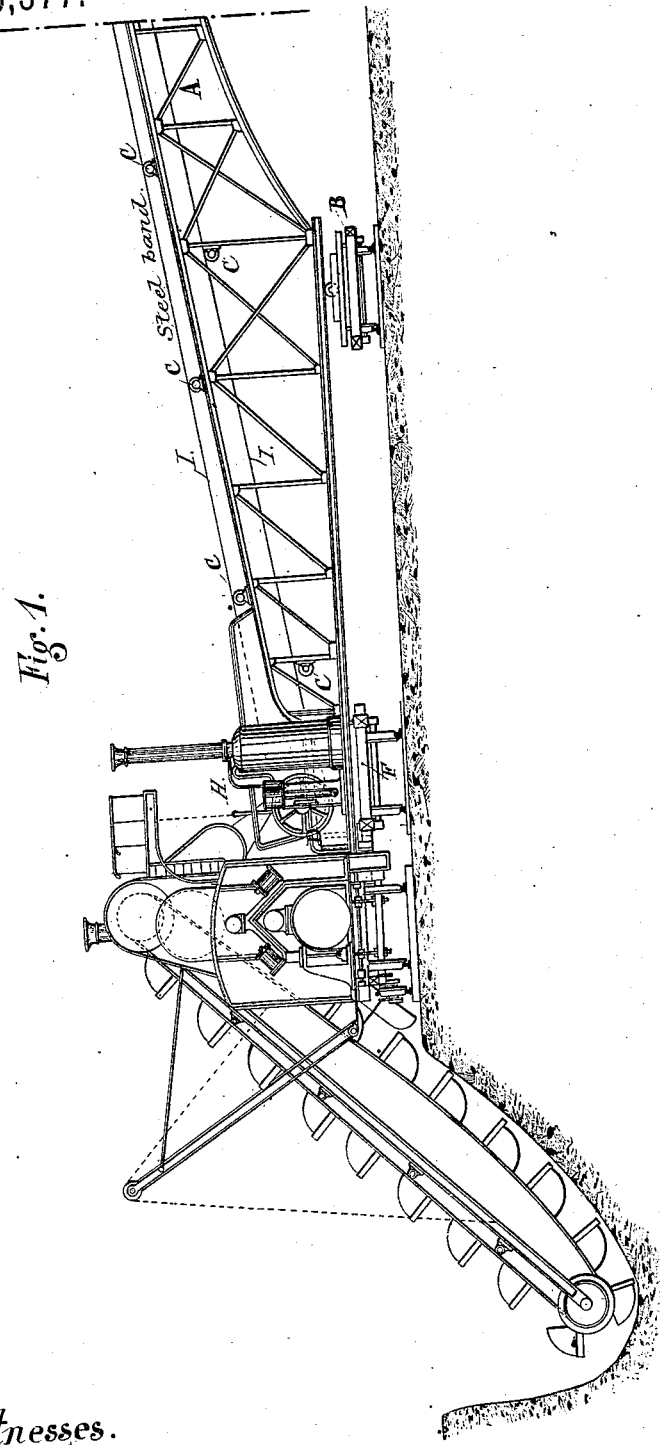

UNITED STATES PATENT OFFICE.

MICHEL MAROLLE, OF PARIS, FRANCE.

CONVEYER FOR EXCAVATORS, DREDGERS, &c.

SPECIFICATION forming part of Letters Patent No. 316,377, dated April 21, 1885.

Application filed January 29, 1885. (No model.) Patented in England May 22, 1884, No. 8,097.

*To all whom it may concern:*

Be it known that I, MICHEL MAROLLE, a citizen of France, residing at Paris, in the Department of the Seine, France, have invented new and useful Improvements in Conveyers for Excavators, Dredges, and like Machines, (for which British Letters Patent No. 8,097, dated May 22, 1884, have been granted,) of which the following is a specification.

The invention relates more particularly to a mechanical conveyer for carrying to a distance and there depositing the earth as it is raised by dredges, excavators, or other elevating apparatus, and deposited in or on the conveyer. The improved conveyer has an endless steel apron which is stretched between and travels around revolving drums journaled in bearings on a girder that projects beyond the supporting vehicle or vehicles. Between the drums the apron runs on rollers. Suitable means are provided for retaining the material on the endless apron. The conveyer is specially useful in connection with excavators, dredges, or elevators using an endless series of buckets.

In the accompanying drawings, Figure 1 is a side elevation of a conveyer constructed in accordance with the invention in connection with an excavator, the outer end of the conveyer being removed; Fig. 2, a side elevation of a conveyer in connection with a dredger, and Fig. 3 a side elevation of a conveyer in connection with an elevator for unloading scows or barges.

The excavator, dredger, and unloader are or may be of ordinary or suitable construction, and require no particular description. As shown, they have an endless series of buckets, such as used in one of the well-known forms of apparatus.

The overhanging girder or beam A, which supports the movable apron of the conveyer, is upheld at one or more points by an intermediate support, B. The apron I travels upon the rollers C, and at the ends of the girder or beam A passes around the drums D E, respectively. The drum E is shown in Figs. 2 and 3.

At the inner end of the beam or girder is a steam-engine, H, which actuates the apron I by turning the drum D.

The engine and gearing are or may be of any ordinary or suitable construction. They are supported on the vehicle F, (shown as a railway-truck in Fig. 1 and as a boat in Figs. 2 and 3,) to which the inner end of the beam or girder A is pivoted, so that it can be moved from side to side by means of a windlass acting upon one or more wheels, and actuated by hand or by the steam-engine.

The principal element or apron I of the conveyer is composed of one or more endless belts or bands of sheet-steel sufficiently flexible to bend around the drums D E, and of sufficient resistance to support buckets, corrugated sheet-iron, wire-cloth, or other suitable devices or fabric adapted to retain or support the material to be conveyed. The fabric can be rendered impermeable by means of oxide of copper, gutta-percha, or india-rubber. Fabric of aloe fiber, animal hair, esparto fiber, and the like, may in certain cases be employed to advantage, these fabrics being supported by round or flat cables and upheld by the steel apron. In case of need copper or other solid flexible metal can be substituted for steel. If use is made of corrugated sheet-iron, it is fastened on the steel apron by iron bolts. Where the conveyer has a great inclination, the sheet-iron can be fastened under the steel bands, and the material to be conveyed rest in the pockets formed by the corrugations of the sheet-iron.

To prevent the materials conveyed from falling off the side of the apron, webs or lace-work of cotton, which does not contract when wet like hemp and rubber, may be used. These webs or lace-work, or the threads composing the same, can be enveloped with a metal spiral to protect them from injury.

In case a cloth apron resting upon and upheld by the steel apron is used, the edges can be upturned, and a web or band of rubber can be there placed so that it is not exposed to injury from the materials conveyed.

To avoid the difficulties that would arise from the stretching of the apron, the bearings of the outer drum, E, should be movable and be pressed outward by springs, so as to keep the apron stretched.

It is evident that modifications can be made in details without departing from the spirit of the invention—as, for example, the forms, dimensions, proportions, and materials of different parts can be changed, as well as the accessories to be employed.

I claim—

1. The conveyer composed of the overhanging beam or girder, and the endless steel band or apron traveling over drums and rollers on said beam or girder, and adapted to receive and transport earth and like material, substantially as described.

2. The combination, with an excavator or similar apparatus—such as a dredger or elevator—of a conveyer having an endless steel belt or apron onto which the material excavated or lifted is delivered by said excavator or dredger, substantially as described.

3. The combination of the beam or girder, the endless steel conveyer, belt or apron thereon, and the vehicle or vehicles supporting said parts, substantially as described.

4. The conveyer with endless steel belt or apron having the special disposition and arrangement of parts hereinbefore described.

5. The conveyer comprising, in combination, an overhanging beam or girder, a vehicle to which the same is pivoted, so as to swing laterally, a movable support between the pivot and the outer end of the beam or girder, and the endless steel belt or apron, adapted to receive and transport earth and like material, traveling over drums and rollers on said beam or girder, substantially as described.

In testimony whereof I have signed this specification in the presence of two subscribing witnesses.

MICHEL MAROLLE.

Witnesses:
AUG. VINCK,
V. FAUR.